United States Patent Office 3,333,899
Patented Aug. 1, 1967

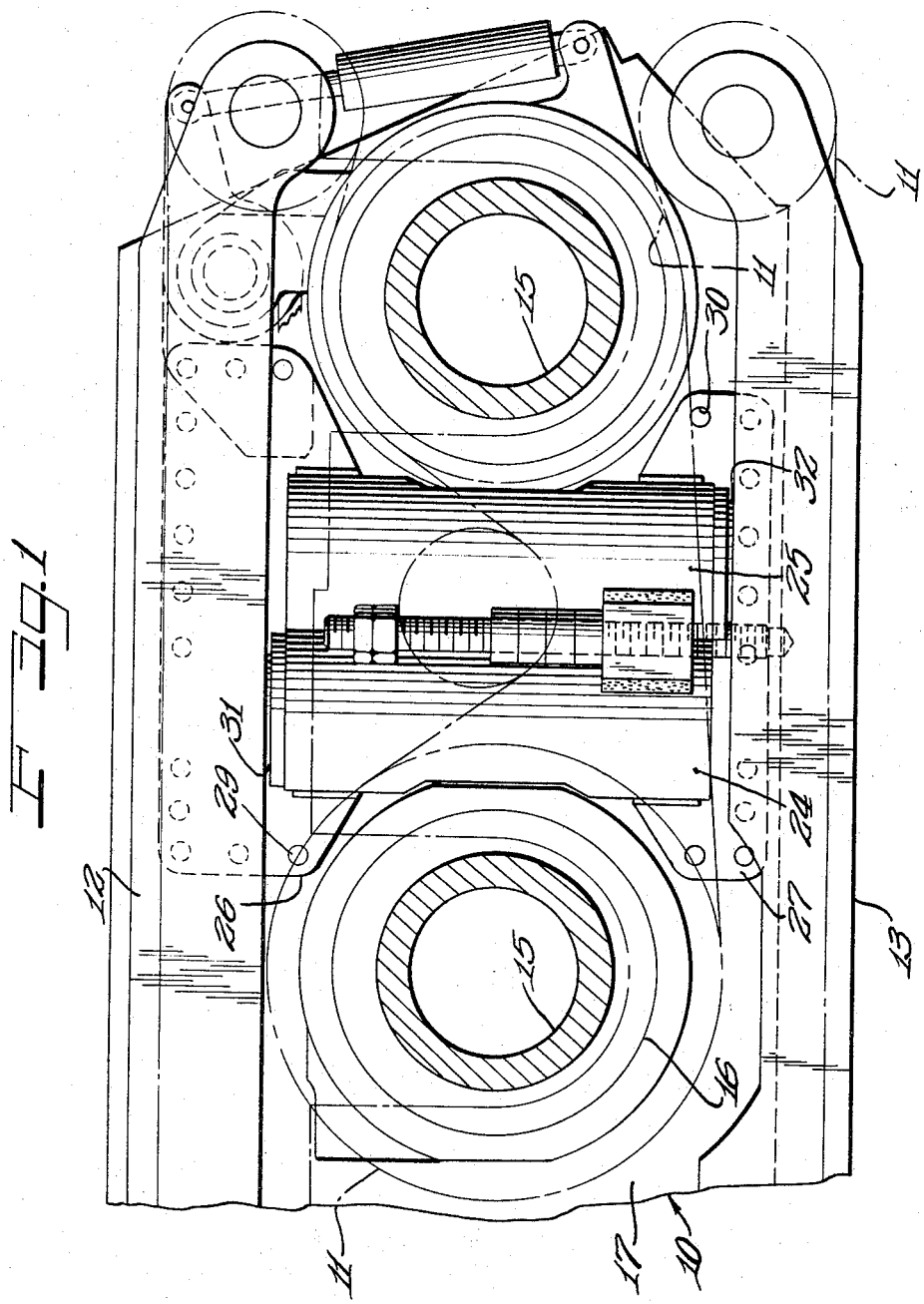

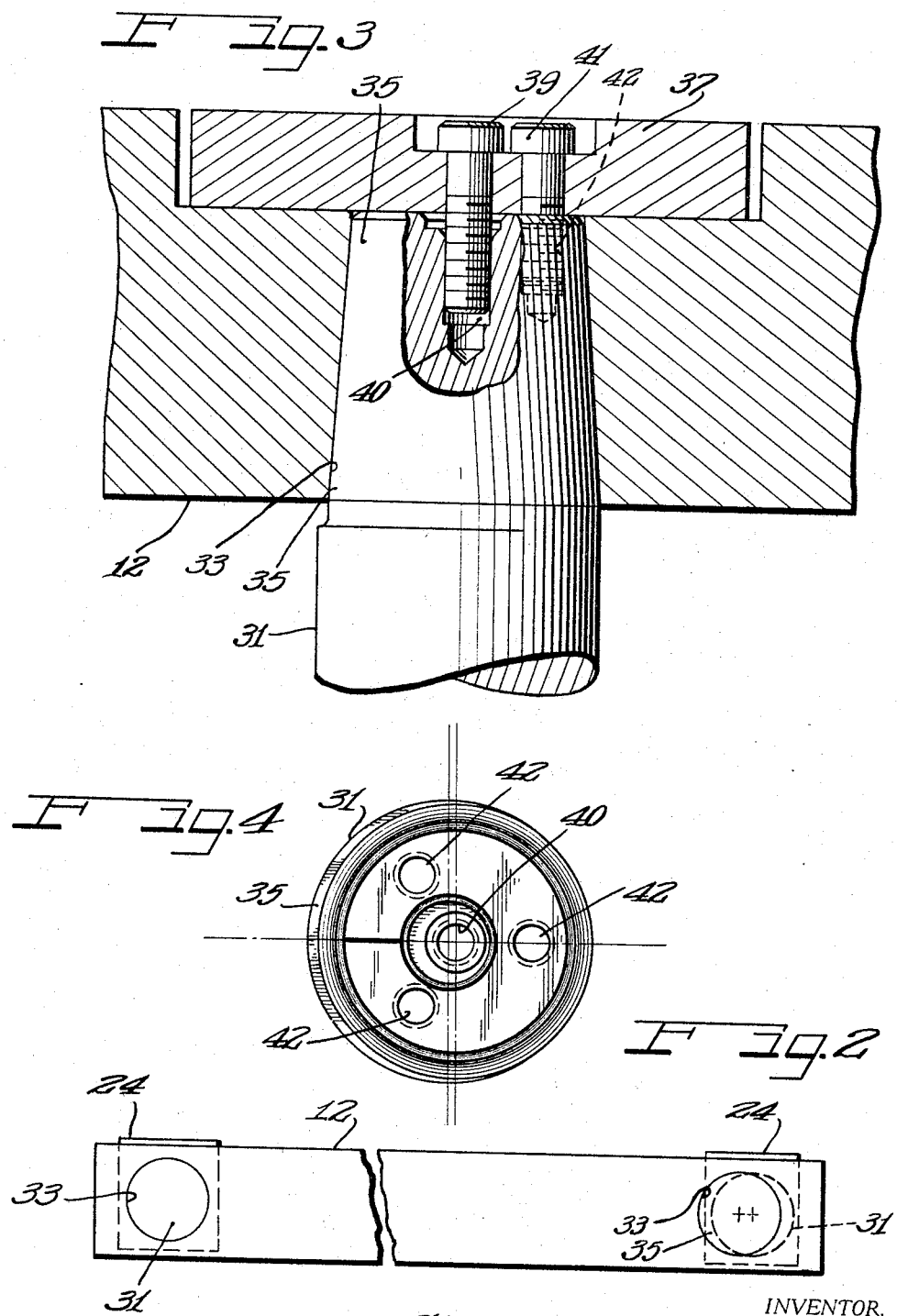

3,333,899
TRIMMER BAR MOUNTING FOR CONTINUOUS MINING MACHINES
Stephen M. Christian, Harvey, Ill., assignor to Goodman Manufacturing Company, Chicago, Ill., a corporation of Illinois
Filed Apr. 12, 1965, Ser. No. 447,218
5 Claims. (Cl. 299—80)

ABSTRACT OF THE DISCLOSURE

Mounting for trimmer bar on the piston rods of the trimmer bar supporting and adjusting cylinders, bolted directly to the front face of the cutter frame, supporting the rotary boring heads. The inaccuracies in location of the bolt holes are compensated for by providing a tapered eccentric connecting end on one piston rod which may be registered with a tapered socket in the trimmer bar by turning the piston rod in its cylinder until it is in registry with its socket. The connecting end of the piston rod is then drawn along the socket and clamped thereto.

Background of the invention

In continuous mining machines of the boring type having a plurality of rotary boring heads and upper and lower trimmer bars spaced behind the boring heads and forming guides for a cutter chain trimming the cusps left between the boring heads, the trimmer bars are usually mounted on piston rods extensible from cylinders mounted on the front of the cutter frame or support for the boring heads, for adjustable movement with respect to the floor and roof of the mine, to conform the trimmer bars to seams of coal of varying heights.

The cylinders are usually bolted to the front face of the cutter frame, supporting the boring heads, and are spaced a relatively wide distance apart. Where the cylinders are bolted to the cutter frame, the bolt holes many times are inaccurately drilled, with the result that the centers of the piston rods seldom agree with the sockets in the trimmer bar fitting on the piston rods, and many times the centers of the sockets are as much as one-eighth inch off-center with respect to the centers of the piston rods. The correction of this off-centered condition then becomes a time consuming and expensive operation.

Summary of invention and objects

The present invention remedies the foregoing deficiencies and simplifies the assembly of the trimmer bars to the adjusting cylinders of the machine by providing a piston rod for one end of each upper and lower trimmer bar with an off-set or eccentric connecting end portion eccentric of the center of the cylinder and accommodating the alignment of the piston rods with the sockets in the trimmer bars by the simple operation of turning the piston rods in their cylinders until they register with the sockets.

A principal object of the invention is to provide a simple and improved adjustable connection between the piston rods of the adjusting cylinders of a continuous mining machine and the trimmer bar supported thereon, accommodating the trimmer bar to have preformed uniformly spaced sockets to fit on the ends of the piston rods, in which the center of one piston rod is adjustable with respect to the center of its cylinder to enable the piston rod to readily be aligned with its socket.

Another object of the invention is to provide a system for mounting the trimmer bars of continuous mining machines on supporting and adjusting piston rods therefor, in which the connecting end of at least one piston rod is eccentric of the center of its cylinder and is registered with the center of the mounting socket of the trimmer bar, by the simple operation of turning the piston rod in its cylinder.

A still further object of the invention is to provide a support for the upper and lower trimmer bars of a continuous mining machine on the cutter frame therefore, in which individual vertically extending cylinders are bolted to the cutter frame adjacent opposite ends thereof, and the piston rods extensible from the cylinders on one end of the cutter frame have connecting end portions concentric with the centers of their cylinders, and the piston rods at the opposite end portion of the cutter frame have connecting end portions eccentric of the centers of their cylinders, to enable ready registry of the piston rods with the sockets in the trimmer bar, by the simple operation of turning the piston rods in their cylinders.

These and other objects of the invention will appear from time to time as the following specification proceeds and with reference to the accompanying drawings wherein:

FIGURE 1 is a fragmentary front end view of a part of a continuous mining machine, with the boring heads broken away in order to illustrate the mounting means for the trimmer bars on the cutter frame of the machine;

FIGURE 2 is a diagrammatic top plan view of a trimmer bar of a continuous mining machine, showing the mounting of the trimmer bar on its supporting and adjusting cylinders, and illustrating the principles of the present invention;

FIGURE 3 is a fragmentary transverse sectional view taken vertically through one end portion of a trimmer bar shown in FIGURE 1 and illustrating one method of mounting the trimmer bar on a supporting and adjusting piston rod, in accordance with the principles of the present invention; and FIGURE 4 is a top plan view of the piston rod shown in FIGURE 3.

In the embodiment of the invention illustrated in FIGURE 1 of the drawings, the front end portion of one-half of a continuous mining machine of the rotary boring type is partially shown. The mining machine generally includes a transversely extending cutter frame 10, supported in front of the main frame of the machine (not shown) and forming a support for a plurality of rotary boring heads (not shown). The cutter frame 10 also forms a housing for gearing for driving said boring heads and for driving a conventional trimmer chain 11, designated by dot-dash lines along an upper trimmer bar 12 and along a lower trimmer bar 13. The upper and lower trimmer bars are adjustably mounted on the cutter frame 10, to position the trimmer bars 12 and 13 to guide the trimmer chain 11 to trim the cusps left between the boring heads, depending from the mine roof and extending upwardly from the mine floor in a conventional manner.

The machine shown is of a type used for mining low seams of coal and ordinarily has four rotary boring heads (not shown), two being spaced one each side of the longitudinal center line of the machine although it may have any conventional number of boring heads. The boring heads are mounted on the usual hollow shafts 15, 15 journalled in hubs 16, 16 extending forwardly of a front face 17 of the cutter frame. The boring heads and the support and drive means therefore are no part of the present invention so need not herein be shown or described further.

The cutter frame 10 is also usually mounted to extend forwardly beyond a main frame (not shown) of the machine and to be vertically adjusted with respect to said main frame in a conventional manner. The main frame of the machine is supported on the usual continuous traction tread devices (not shown) for feeding the boring heads and trimmer bars into the working face of the mine to effect a mining operation and for tramming the machine from working place to working place.

Two adjacent cylinders 24 and 25 are mounted on the front face 17 of the cutter frame 10 adjacent each side of said cutter frame and are herein shown as being disposed between the hubs 16, 16 supporting the rotary boring heads (not shown). The cylinders 24 and 25 are welded or otherwise secured to upper and lower flanged bracket plates 26 and 27 having bolt holes 29 and 30 respectively leading therethrough, registering with similar bolt holes (not shown) in the front face 17 of the cutter frame 10, and affording a means for bolting each set of cylinders 24 and 25 to the front face of the cutter frame.

The cylinders 24 each have a piston rod 31 extensible therefrom and forming an adjustable mounting for one end of the upper trimmer bar 12. In a like manner the cylinders 25 each have a piston rod 32 extensible therefrom and forming a mounting member for one end of the lower trimmer bar 13, to hold said trimmer bar in position and adjustably move said trimmer bar with respect to the mine floor.

As diagrammatically shown in FIGURE 2, the piston rod 31 is concentric with the connector socket 33 formed in the upper trimmer bar 12, while the piston rod 31 at the opposite end of the trimmer bar has an eccentric connector or rod end 35, eccentric of the center of the cylinder 24, to accommodate pivotal movement of the piston rod in its cylinder to align the connector end of the piston rod with its socket 33.

The lower trimmer bar 13 is provided with similar sockets (not shown) and one piston rod 32 has a rod or connector end concentric with its cylinder 25 while the opposite piston rod has a connector or rod end (not shown) eccentric of the center of its cylinder 25, to accommodate the ready registering of the connector ends of the piston rods with the sockets in the lower trimmer bar, where the piston rods would normally be out of alignment with the sockets.

In FIGURES 3 and 4 the piston rod 31 is shown as having an eccentric rod or connector end 35, eccentric of the center of the body portion of the piston rod and the cylinder 24. As shown in these two figures, the connector end 35 of the piston rod 31 is tapered and fits into a tapered socket 33, upon turning of the piston rod about the axis of the body portion thereof, to register the eccentric connector end thereof with the socket 33. The piston rod 31 may be retained to its cutter or trimmer bar 12 by a retainer block 37, recessed in said trimmer bar, and by a cap or machine screw 39 extending through said retainer block and threaded into a threaded hole 40 extending axially along the piston rod eccentric of the axis of the body portion thereof. Other machine screws 41 are threaded in threaded holes 42, spaced equal radial distances from the threaded hole 40.

The degree of eccentricity of the connecting end 35 of the piston rod 31 is diagrammatically shown in FIGURE 2 in an exaggerated form with the piston rod 31 shown in dotted and the connector end 35 shown in solid and fitting in the socket 33. It may be seen from this that turning movement of the piston rod in its cylinder 24 will change the position of the connector end 35 thereof to register with the socket 33 and that as the piston rod is rotated the position of the trimmer bar 12 will be at an angle with respect to the front face of the cutter frame 17. The angle of the trimmer bar with respect to the front face 17 of the cutter frame 10 is, however, slight and may be varied without affecting the operation of the trimmer chain, or causing binding of the piston rods within their cylinders.

It may be seen from the foregoing that I have provided an extremely simple system and apparatus for mounting the trimmer bars of boring types of continuous mining machines on their supporting and adjusting cylinders and that this mounting means makes it possible to bolt the cylinders to the cutter frame of the mining machine and align the piston rods with the sockets in the trimmer bars by the simple operation of turning the piston rod having the eccentric connecting end within its cylinder until the connecting end portion registers with its trimmer bar socket.

While I have herein shown and described one form in which the invention may be embodied, it may readily be understood that various variations and modifications in the invention may be attained without departing from the spirit and scope of the novel concepts thereof.

I claim as my invention:

1. A system of assembling an elongated part having parallel spaced sockets therein to the connecting ends of parallel spaced piston rods extensible from fixed cylinders, at least one of which sockets is tapered, comprising
    the forming of the connecting end of one piston rod concentric with the center of its cylinder,
    forming the connecting end of the other piston rod with a tapered end eccentric of the center of its cylinder,
    registering one socket with the concentric connecting end portion, then turning the piston rod having the eccentric tapered connecting end portion about the axis of the cylinder into direct registry with the other socket,
    then placing the elongated part on the piston rods with the connecting end portions thereof engaging the sockets in the elongated part and taking up on the taper of the eccentric end portion along its tapered socket.

2. A system of assembling the vertically movable trimmer bar of a continuous mining machine to supporting and adjusting piston rods therefor, extensibly and retractibly movable with respect to spaced vertically extending cylinders fixed to the cutter frame of the machine, comprising
    the provision of parallel spaced vertically extending sockets in the trimmer bar, adjacent opposite ends thereof and located fixed distances apart, one of which sockets is tapered,
    forming the connecting end portion of one piston rod concentric with its cylinder,
    forming the connecting end portion of the other piston rod eccentric of its cylinder and tapering the eccentric connecting end portion to conform to the taper of the tapered socket,
    registering one socket with the concentric end portion of one piston rod, with the trimmer bar generally parallel to the cutter frame,
    turning the other piston rod within its cylinder to register the eccentric tapered connecting end portion with the opposite socket, and then placing the trimmer bar on the piston rods with the connecting end portions thereof extending within the sockets the full depth thereof, and securing the trimmer bar to the piston rods and taking up on the taper between the tapered piston rod and its socket.

3. In an apparatus in the class described, a frame,
    a pair of parallel spaced cylinders fixedly secured to said frame,
    piston rods extensibly and retractibly movable with respect to said cylinders and having body portions having axes concentric with the axes of said cylinders,
    one piston rod having a connecting end portion concentric with its cylinder and the other piston rod having a tapered connecting end portion eccentric of its cylinder,
    an elongated member having two parallel aligned sockets therein spaced fixed distances apart one of which sockets is tapered,
    said sockets fitting directly on the connecting end portions of said piston rods by turning of one piston rod, to register its connecting end portion with the associated socket, and to accommodate the lowering of the elongated member onto said piston rods, and means taking up on the taper between the eccentric tapered connecting end portion of the piston rod and its socket.

4. In a continuous mining machine,
a cutter frame,
at least one trimmer bar extending along said cutter frame in advance thereof,
a pair of parallel spaced cylinders secured to said cutter frame and extending vertically thereof and having piston rods extensible therefrom,
and means mounting said trimmer bar on said piston rods comprising
    a pair of uniformly spaced parallel sockets formed in said trimmer bar,
    a concentric connecting end portion on one piston rod registrable with one of said sockets,
    and an eccentric connecting end portion on the opposite piston rod turnable to register directly with the other of said sockets, where the axes of the associated cylinder may be out of alignment with the axes of the associated socket.

5. The structure of claim 4 wherein one of the sockets is tapered, wherein the eccentric connecting end portion of the piston rod is tapered to conform to the taper of the tapered socket, and wherein means are provided to draw said trimmer bar along said eccentric tapered end portion of said piston rod and clamp said trimmer bar to said piston rod.

References Cited
UNITED STATES PATENTS

| | | | |
|---|---|---|---|
| 2,757,917 | 8/1956 | Cartlidge | 299—61 |
| 2,815,196 | 12/1957 | Hlinksy | 299—59 |
| 2,907,558 | 10/1959 | Hlinsky | 299—59 |
| 3,048,904 | 8/1962 | Kloster | 287—20 X |

ERNEST R. PURSER, *Primary Examiner.*

UNITED STATES PATENT OFFICE
CERTIFICATE OF CORRECTION

Patent No. 3,333,899 August 1, 1967

Stephen M. Christian

It is hereby certified that error appears in the above numbered patent requiring correction and that the said Letters Patent should read as corrected below.

Column 6, lines 2 and 4, for "axes", each occurrence, read -- axis --.

Signed and sealed this 25th day of June 1968.

(SEAL)
Attest:

Edward M. Fletcher, Jr.
Attesting Officer

EDWARD J. BRENNER
Commissioner of Patents